United States Patent [19]

Ahlstone

[11] 4,120,520
[45] Oct. 17, 1978

[54] LOCKABLE RIGID CONNECTOR FOR PIPE AND METHOD OF MAKING THE SAME

[75] Inventor: Arthur G. Ahlstone, Ventura, Calif.

[73] Assignee: Vetco, Inc., Ventura, Calif.

[21] Appl. No.: 793,525

[22] Filed: May 4, 1977

[51] Int. Cl.² .......................................... F16L 35/00
[52] U.S. Cl. ................................. 285/18; 285/81; 285/305; 285/381
[58] Field of Search ............... 285/18, 381, 90, 91, 285/305, 321, 276, 89, 81, 82, 405, 382, 382.4, 39, 308, 309; 403/15; 29/421, 427, 446, 525, 526, 157 R

[56] References Cited

U.S. PATENT DOCUMENTS

| | | | |
|---|---|---|---|
| 2,065,740 | 12/1936 | Reed | 285/305 X |
| 2,440,452 | 4/1948 | Smith | 285/321 X |
| 2,671,949 | 3/1954 | Welton | 29/446 |
| 2,886,355 | 5/1959 | Wurzel | 285/321 X |
| 3,114,566 | 12/1963 | Coberly et al. | 285/18 |
| 3,507,532 | 4/1970 | Gross et al. | 285/305 X |
| 3,606,393 | 9/1971 | Huntsinger et al. | 285/308 X |
| 3,827,728 | 8/1974 | Hynes | 285/309 X |

FOREIGN PATENT DOCUMENTS 1,238,801  7/1960  France ..................... 285/305

Primary Examiner—Werner H. Schroeder
Assistant Examiner—C. J. Arbes
Attorney, Agent, or Firm—Subkow and Kriegel

[57] ABSTRACT

A pipe connector has a pin initially stabbed into a box, the pin and box then being axially loaded together at confronting transverse surfaces while the pin and box are pressurized to expand the box and compress the pin, so that when the pressure is relieved a pressure energized shrink fit is provided and the connector is rendered rigid to enhance tensile, compressive and bending strength and provide a fluid tight joint useful in making up lengths of pipe such as piles and pipelines. Locking means are installed while the connector is pressurized, is axially loaded by a loading tool and before pressure is relieved, the locking means engaging between opposed pin and box shoulders to retain the pin in compression and the box in tension when the pressure is relieved and the loading tool removed. The locking means is a wire, discs, balls or a split ring.

19 Claims, 10 Drawing Figures

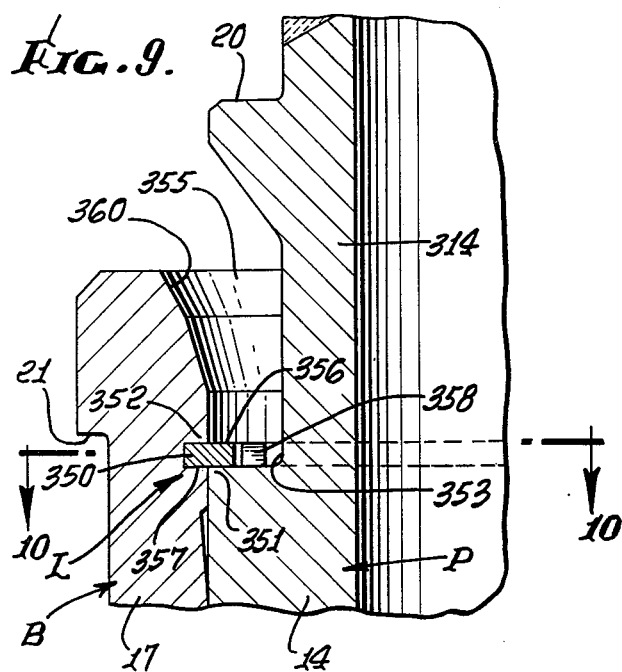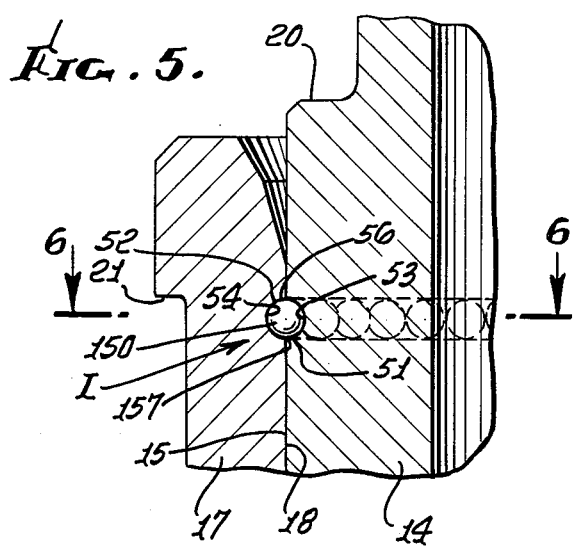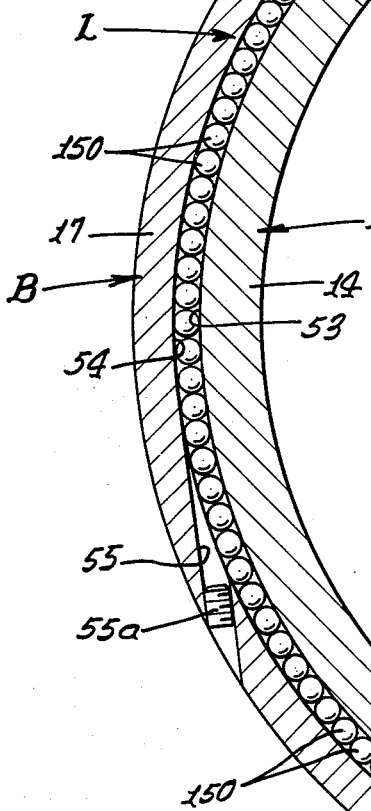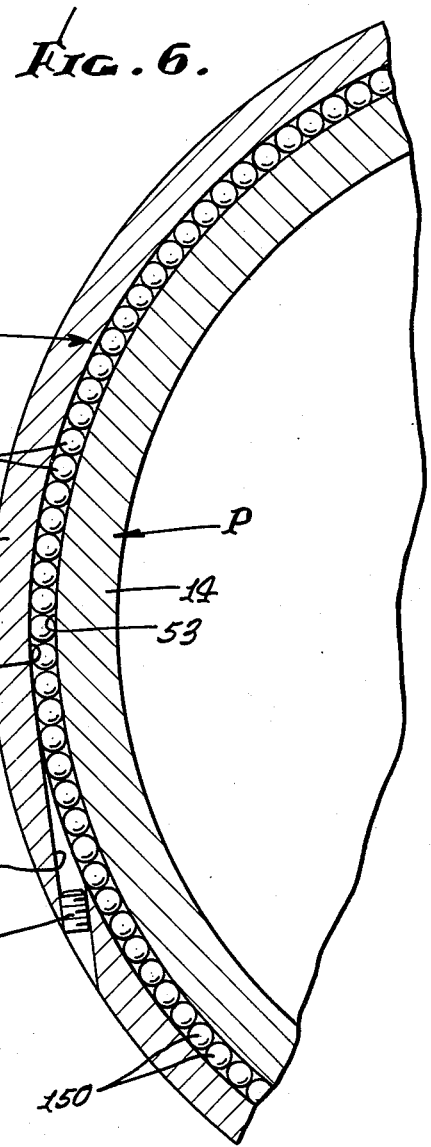

LOCKABLE RIGID CONNECTOR FOR PIPE AND METHOD OF MAKING THE SAME

Heretofore, it has been known that pipe joints or connections may be made up with an interference fit between the pin and the box, by applying fluid pressure between the opposing threaded portions of the pin and the box while the joint parts are rotated to cause the pin and box to shoulder, thereby avoiding the necessity for heating the joint parts to effect a shrink fit. For example, reference may be had to U.S. Pat. No. 2,671,949, granted Mar. 16, 1954, in the name of R. L. Welton, for "Method of Making Tool Joints".

It is also known that pipe line connectors or pile connectors of relatively large diameter can be improved in terms of strength and resistance to separation due to rebound during pile driving operations, if the pin and box are provided with confronting shoulders which are loaded into axial compressive engagement. For example, reference is made to the pending application for United States patent Ser. No. 712,491, filed Aug. 9, 1976, in the name of L. E. Reimert, for "Rigid Connector And Piling".

In the pending application of Martin B. Jansen, Jr., Ser. No. 742,072, filed Nov. 5, 1976, there is disclosed a threaded connector for a pipe string, such as a production riser used in connection with sub-aqueous wells, in which the threaded connection between the pin member and the box member of the connector is made up initially through an application of relatively low torque to the members, after which the connector has a straight line pretensioning force of a high tensile value applied to it through use of a suitable tool, the high pretensioned force being retained between the mating threads of the pin and box member by a reaction member threaded on the pin member and rotated into solid engagement with the box while the pretensioned force is being applied, to lock the preload into the connector between the threads.

In the laying of pipelines, such as offshore pipelines, the joints of pipe are commonly welded, usually on lay barges having work stations for horizontally lining up lengths of pipe, welding the joints, grinding the joints, and subsequent inspection and coating. Such lay barges are very costly, even when used for laying relatively small pipelines in shallow water, and range upwardly, when used for laying larger pipelines offshore.

At the present time, such lay barges may cost up to $350,000.00 per day. When greater water depths are encountered, horizontal pipeline laying becomes impractical, but vertical pipeline installation from semi-submersible rigs constitutes a practical and relatively economical pipeline installation procedure. Welding of the joints or connections is generally preferred, since most connectors are not rigid or are not locked up and must generally be stabbed at a batter angle while the mating joint parts are controlled during makeup by elaborate devices.

There is, accordingly, a need for connectors for pipeline connections and pile connections which can be made up vertically, or with the pipe at a batter angle, say while supported and handled by equipment such as that present on drilling rigs or semi-submersible drilling rigs, which connectors are durable, safe, easy to make up and have pressure resistance, tensile, compression and bending strength characteristics in excess of such characteristics of the pipe body.

The present invention satisfies the need for such connectors by providing a rigid, stab-type connector or pin and box joint which is pre-loaded together axially to force opposed transverse pin and box surfaces into compressive engagement, while the pin and box are subjected to pressure between their confronting or companion interfitting surfaces, to expand the box and compress the pin radially. When the pressure is relieved, the connector is rigid, has an interference fit and is axially pre-loaded so as to have bearing contact for pile driving which resists axial separation due to rebound effects, and has superior tensile, compression, bending and pressure capability, exceeding that of the pipe joined by the connector. Such joints are, therefore, idealy suited for, but not limited to, use in marine piles and pipelines.

In accomplishing the foregoing, the connector has a box section having an internal transverse surface or shoulder and is adapted to have a pin section inserted therein with the inner transverse end surface of the pin disposed for abutting engagement with the shoulder in the box. Axially spaced companion tapered metal sealing surfaces in the box and on the pin are coengaged, and if desired supplemental ring seals may be provided between the metal-to-metal sealing surfaces. The box has a pressure fitting enabling fluid to be supplied under pressure between the pin and box within the region spanned by the sealing portions to pressure energize the box and pin and effect resilient expansion of the box and contraction of the pin, while a pre-load tool is applied to opposing radial shoulders or tool engaging projections on the box and on the pin. Actuation of the tool enables the connector to be finally or fully made up with a predetermined compressive load on the coengaged box and pin transverse surfaces or shoulders, with the box under tension and the pin under compression, and when the energizing pressure on the box and pin is then released, while the parts are held in the pre-loaded condition by the pre-load tool, the box contracts and the pin expands to provide an interference or shrink fit interlocking the connector parts together in their pre-loaded condition.

As disclosed in my companion application, Ser. No. 726,947, filed May 4, 1977, for "Rigid Connector for Pipe and Method of Making the Same", the box and pin are held in the preloaded condition by the interference fit of opposed tapered surfaces and including in some forms, locking means, shown as threads or ribs, which prevent axial separation of the pin and box or relaxation of the compressive pre-load, even during rebound when the connector is used in a pile subjected to the blows of a pile driver. The tapered metal-to-metal sealing surfaces prevent leakage from or into the joint and the combination of the axial pre-load, and the pressure energized fit provides a connector having the advantageous characteristics described above.

According to the present invention, locking means are provided between the pin and the box to hold the pin in compression against the box shoulder and to hold the box in tension against the pin, by installing a locking element or locking elements between opposed shoulders on the pin and on the box, while the connector is held in a pre-loaded condition with the pressure fluid applied between the pin and box. More particularly, the locking shoulders provided are circumferentially extended, and the box has a tangential opening leading from the outside of the box to an annular space between the shoulders, so that the locking elements, in the form of a bar, or wire, balls, discs, or the like, can be inserted through the tangential opening between the shoulders. Alternatively, a split, resiliently expansible lock ring can be installed between the shoulders. After installation of the locking element or elements, the pre-load force and the fluid pressure between the pin and box are relieved, so that the pressure energized interference fit is provided and the locking elements prevent separation of the pin and box. If separation of the connector is contemplated, the various locking elements may be removable following re-application of the pressure fluid and pre-load forces.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIg. 3 is an enlarged fragmentary longitudinal section of the pipe connector of FIG. 2 in a fully made up condition and locked together according to one form of the invention;

FIG. 4 is a fragmentary transverse section as taken on the line 4—4 of FIG. 3;

FIG. 5 is a fragmentary longitudinal section showing another form of lockable pipe connector;

FIG. 6 is a transverse section, on a reduced scale, as taken on the line 6—6 of FIG. 5;

FIG. 9 is a fragmentary longitudinal section showing yet another form of lockable connector; and FIG. 10 is a transverse section, on a reduced scale, as taken on the line 10—10 of FIG. 9.

Figure 1:
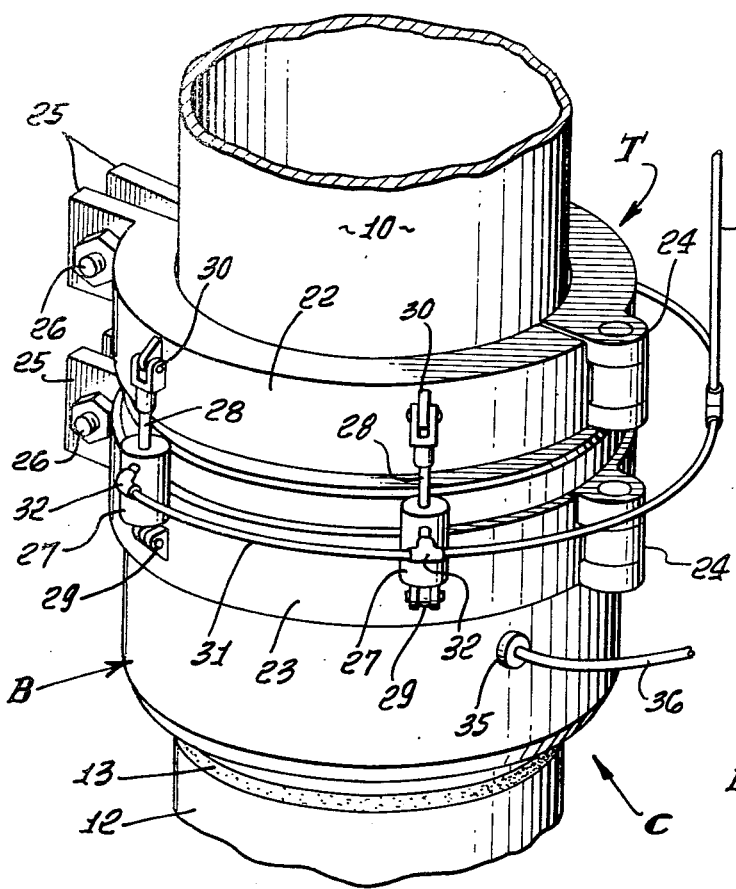
FIG. 1 is a perspective illustrating a pipe and a lockable connector during assembly and in a clamping tool for axially loading the connector while it is pressurized.

As seen in the drawings, a pipe connector C made in accordance with the invention, comprises an upper pin section P and a lower box section B adapted to interconnect pipe lengths, including an upper pipe section 10, secured by a circumferentially continuous weld 11 to the upper end of the pin P, and a lower pipe section 12, secured by a circumferentially continuous weld 13 to the lower end of the box section B. The connector C is shown and will be described as one wherein the connection is stabbed together by insertion of the downwardly extending pin into the upwardly facing box. It should be understood, however, that in the case of some uses of the connector, this relationship of pin to box may be reversed and the box moved over the pin. Preferably, the inner, upper end of the box B is outwardly flared to facilitate stabbing of the pin into the box, and the tapered form of the parts progressively aligns the parts, as the pin moves into the box. The taper angle is preferably a locking angle.

The pin section P includes a circular body section 14 having an external downwardly tapering surface 15 and a lower end surface 16 which extends transversely of the pin body 14. The box section B comprises a circular body section 17 having an internal downwardly tapered surface 18 complemental to the tapered surface 15 of the pin body, whereby when the pin body is inserted or stabbed into the box, the complemental tapered surfaces 15 and 18 are disposed in confronting coengagement. The box body 17 also includes an inner lower transversely extended shoulder or surface 19 against which the pin surface 16 abuts when the connector is made up. The strength of such joints, as thus far described, in terms of resistance to axial separation or tensile strength, compressive and bending strength, as well as the ability of the connector to withstand fluid pressure, both from within and from without, is dependent upon the extent to which the confronting transverse surfaces 16 and 19 are axially preloaded and the extent to which there is a tight interference fit between the confronting tapered surfaces 15 and 18 of the respective pin and box members.

The present invention provides a joint of superior strength characteristics by reason of the fact that the pin and box sections of the joint or connector are made up in a novel manner. In the vicinity of the upper end of the pin body 14, it is provided with a radially extended, upwardly facing, thrust or pre-load shoulder 20, and adjacent the upper end of the box body 17, it is provided with an external radially outwardly projecting, downwardly facing, thrust shoulder 21. These thrust or pre-load shoulders 20 and 21 are adapted to provide means engageable by a suitable makeup or loading tool T, whereby as indicated by the respective arrows 20a and 21a in FIG. 2, a compressive axial force can be applied to the pin body 14 to load the pin end 16 against the inner box surface 19 while the box body 17 is under tension.

The tool T may be of any suitable form to provide opposing forces as represented by the arrows 20a and 21a, and as illustrated in FIG. 1, such a tool may comprise an upper ring 22 and a lower ring 23, each of the rings 22 and 23 having suitable hinge means 24 hingedly interconnecting ring half parts together so that the ring may be opened for lateral application about the pipe and about the connector. Each ring 22 and 23 also is provided with suitable means, such as outstanding ears 25, at the free ends of the ring half parts, and adapted to receive bolts 26 whereby the rings 22 and 23 may be assembled and secured about the pipe and connector for engagement with the respective thrust shoulders 20 and 21 on the pin and on the box. Means are provided for pulling the rings 22 and 23 axially towards one another, when the rings are disposed about the pipe and connector, so as to apply the opposite forces referred to above. As shown, the pulling means comprises a suitable number of circumferentially spaced hydraulic cylinders 27 having rods 28 projecting therefrom, with the respective cylinders connected to one of the rings as at 29 and the rods connected to the other of the rings as at 30. A hydraulic line 31 is adapted through suitable fittings 32 to supply hydraulic fluid under pressure to the cylinders 27 from a source conduit 33 which is connected to the conduit 31 and to a suitable fluid pressure source (not shown). Thus, when hydraulic fluid is supplied to the cylinders 27 to retract the rods 28 and force the rings 22 and 23 towards one another, the pin and box bodies 14 and 17 can be axially preloaded.

In addition, as mentioned above, the strength of the connector is also dependent upon the interference fit between the opposing tapered pin surface 15 and box surface 18. Accordingly, the box body 17 is provided with at least one radial pressure port 34 threaded to receive a connector fitting 35 for a hydraulic line 36, whereby fluid under pressure can be supplied between the confronting tapered surfaces 15 and 18 of the pin and box between an upper opposed sealing region 37 and a lower opposed sealing region 38 between the tapered pin and box surfaces. The sealing effectiveness of the upper and lower tapered, metal-to-metal sealing regions 37 and 38 may be enhanced by the provision of an upper, annular and resilient sealing ring 39 disposed in a groove 40 in the pin or the box body and a lower, annular and resilient sealing ring 41 disposed in a groove 42 in the pin or the box body, the sealing rings 39 and 41 being sealingly engaged with the opposed tapered surfaces of the respective members.

Figure 2:
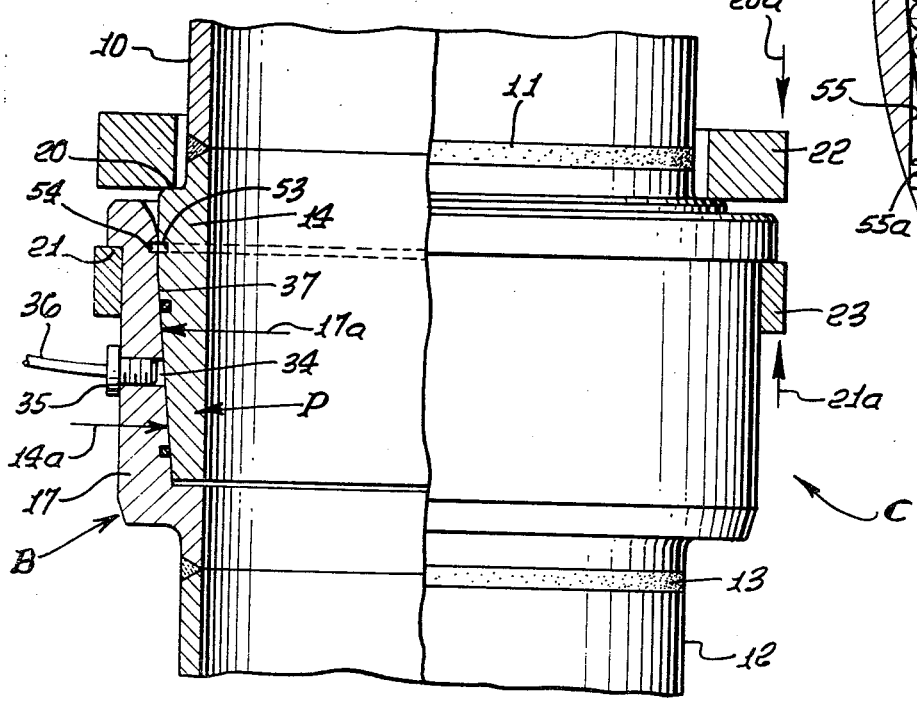
FIG. 2 is a partial elevation and partial longitudinal section of one form of lockable pipe connector, with the clamping tool broken away, and showing the connector parts stabbed together prior to final makeup.

As seen in FIG. 2, and somewhat exaggerated, when the pin P is stabbed into the box B to the extent that a seal is provided at the upper and lower sealing regions 37 and 38 therebetween, the lower end 16 of the pin P is not fully axially loaded against the confronting box shoulder 19, and as previously indicated, such loading is accomplished in response to the application of the opposing forces by the loading tool T. During the operation of the tool T to axially pre-load the connector, hydraulic fluid under pressure is admitted through the port 34, between the upper and lower sealing regions 37 and 38, sufficient to apply substantial circumferential compressive force to the pin body 14, as indicated by the arrow 14a in FIG. 2, and substantial expansive force, as indicated by the arrow 17a, to the body 17 of the box.

The connector is finally made up while the fluid pressure is maintained, by actuation of the tool T to axially load the confronting pin and box surfaces 16 and 19, while the pin body 14 is under compression and the box body 17 is under tension. Accordingly, when the fluid pressure is relieved there will be effected a pressure energized interference fit between the tapered pin surface 15 and box surface 18, while the confronting transverse surfaces 16 and 19 of the pin and box are in an axially preloaded condition. As a result, the completed joint or connector, as seen in FIG. 3, will have superior strength characteristics in terms of tensile, compressive and bending strength and a fluid tight joint is provided which is useful in making up lengths of pipe such as piles and pipelines.

Figures 3, 4:
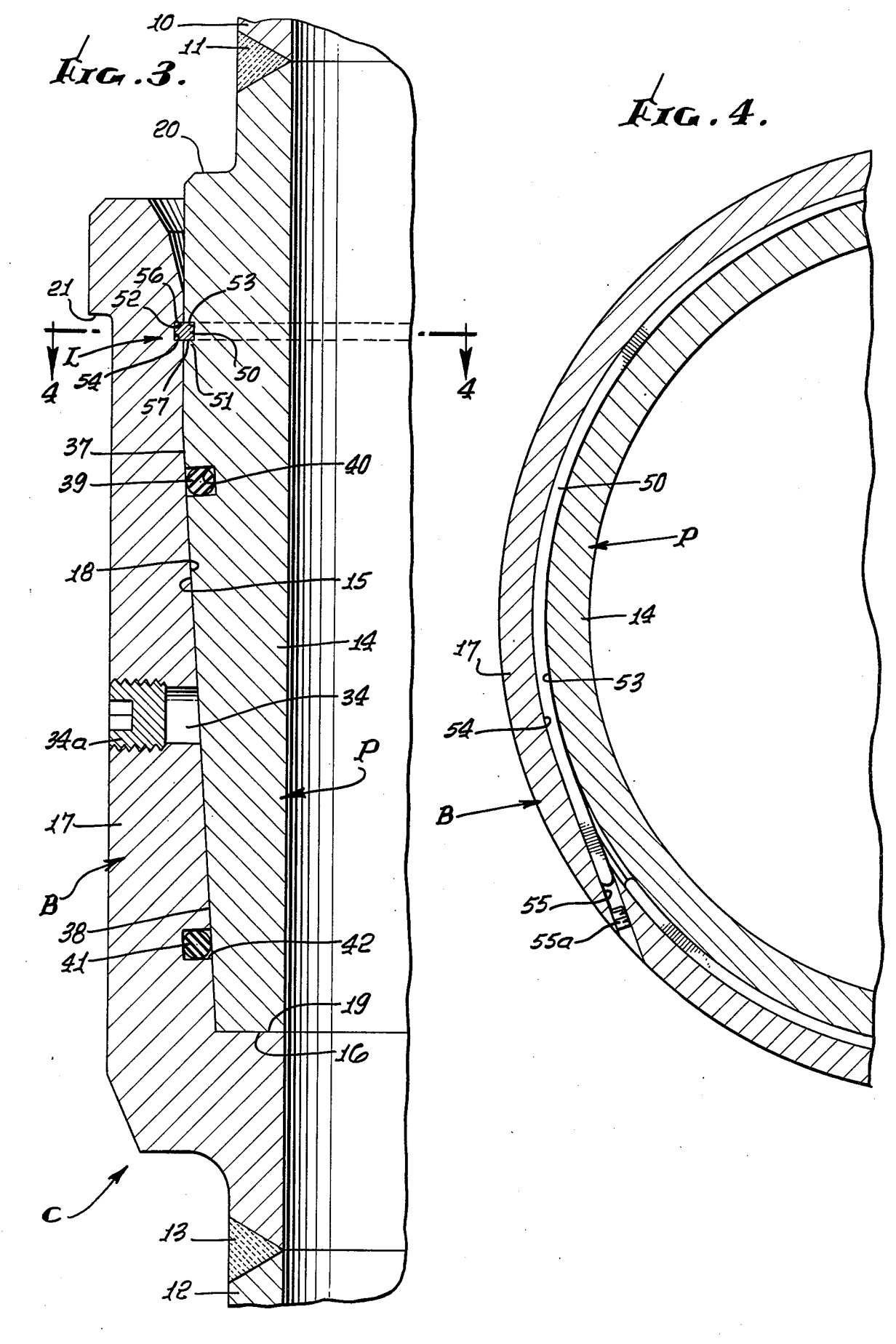

When the hydraulic line connector 35 has been removed from the pressure port 34, it is preferred that the port 34 be pluged by a suitable screw plug 34a as seen in FIG. 3.

Such a connection of pipe sections 10 and 12 can be easily and quickly made with the usual pipe handling equipment found on drilling barges and the like and with the pipe sections disposed vertically or at batter angles while being initially stabbed together and the making up of the connection can be accomplished more quickly than welded connections have been heretofore made. Thus, the invention not only provides a strong and durable connection which can withstand the severe service of subsea pipelines and piles, but economies are effected in terms of the speed with which the connections can be made up utilizing the very expensive rig or barge equipment Referring to FIG. 3 wherein the connection is shown as fully made up, locking means L are provided for further holding the pin body 14 in compression against the box shoulder 19, while holding the box body 17 in tension. This locking means L comprises a locking element 50 disposed between an upwardly facing circumferentially extended shoulder 51 formed on the pin body 14 and a downwardly facing circumferentially extended shoulder 52 formed on the box body 17. The pin shoulder 51 forms the bottom wall of a circumferentially extended groove 53 in the pin, and the box shoulder 52 forms the upper wall of a circumferentially extended groove 54 in the box body, above the upper sealing region 37 between the pin and box bodies. The locking element 50 is adapted to be installed in the grooves 53 and 54 while the pin and box are held in an axially preloaded condition by the tool T and while pressure is being applied between the sealing regions 37 and 38. Accordingly, as seen in FIG. 4, the box body 17 is provided with a tangential opening 55 leading into the opposing grooves 53 and 54 when the connector is fully made up, and the locking element 50 is in the form of a wire insertable through the tangential opening 55 into the opposing grooves 53 and 54, so as to be moveable circumferentially in the grooves, and provided with an upper flat surface 56 and a lower flat surface 57 for confronting coengagement with the upwardly facing pin shoulder 51 and the downwardly facing box shoulder 52. When the fluid pressure between the connector parts and the axial preloading of the parts have been relieved, following insertion of the locking element 50, the opposing pin and box shoulders 51 and 52 engage the wire surfaces 56 and 57 to lock the connector parts against axial separation, whereby the coengaged transverse and tapered surfaces are held in their interference fit which occured as the result of a pressure energization between the pin and the box during make up of the connection, and the connection is maintained rigid, and is ideally suited not only for pipeline installations but also for use in pile driving operations.

While in FIG. 4 only a single tangential opening 55 is illustrated to allow a single locking element in the form of a wire to be inserted into the opposing pin and box grooves 53 and 54, with the wire extending substantially completely circumferentially about the connector, it will be understood that a plurality of such tangential openings may be provided at circumferentially spaced locations and shorter lengths of wire or bars inserted through the tangential openings to provide the locking means. In addition, it is preferred that the tangential opening, or if a plurality are provided, each of the tangential openings, 55 be plugged with a screw plug 55a or the like following insertion of the locking elements.

Referring to FIGS. 5 and 6, another form of locking means L is illustrated for locking the pin body 14 and the box body 17 together, after final make up of the connector, with the pin body, as previously described, compressed axially into the box and with the energized interference fit between the conical surfaces 15 and 18 of the pin and box.

In this form, a plurality of suitable balls 150 are inserted through the tangential opening 55 into the opposing grooves 53 and 54 of the pin and box, so as to be engaged between the upwardly facing circumferential shoulder 51 on the pin and the downwardly facing circumferential shoulder 52 on the box. In this form, the grooves 53 and 54 are arcuate and substantially conform to the shape of the balls 150. The opposing shoulders 51 and 52 effectively form ball races. The balls, as in the case of the wire or rod 50, are inserted while the pin and box shoulders 20 and 21 are engaged by the loading tool T and the energizing pressure is between the tapered surfaces of the pin and the box, so that upon relief of the fluid pressure and the preload force, the pressure energized interference fit is effected between the pin and the box, and the locking balls 150 engage the shoulders 51 and 52 at 156 and 157 to prevent separation of the connection. In the event that disconnection is ultimately contemplated, it will be understood that the balls may be suitably removed from the connection following the re-application of the preloading forces, whereby to reduce frictional resistance to removal of the balls. For purposes of ball removal, it will be understood that the balls may be displaced from the opposing grooves by suitable means (not shown) insertible into the locking groove through another oppositely opening tangential access to the locking groove. Also, the balls may be linked or strung together, in a chain-like assembly, enabling the string of balls to be pulled from the grooves.

Figure 7:
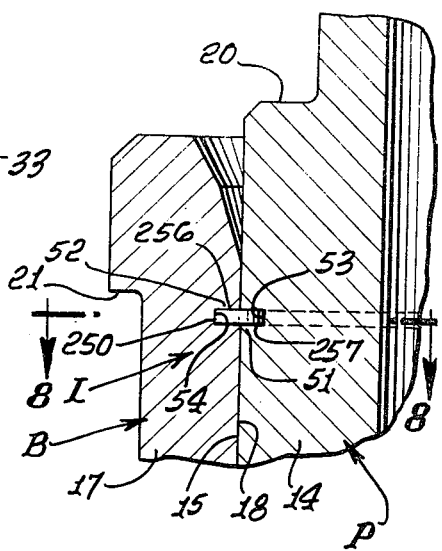
FIG. 7 is a fragmentary longitudinal section showing still another form of lockable connector.
Figure 8:
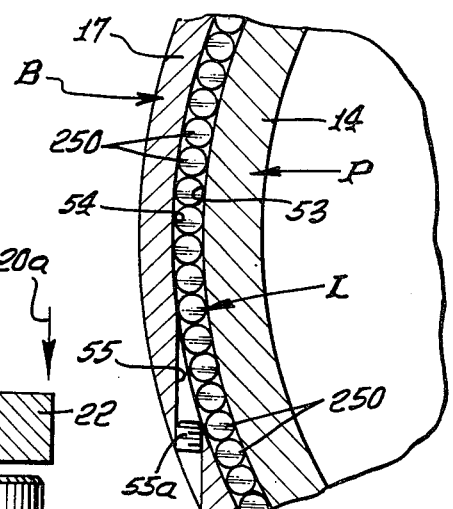
FIG. 8 is a transverse section as taken on the line 8—8 of FIG. 7.

Referring to FIGS. 7 and 8, another form of locking means L is illustrated for locking the pin body 14 and the box body 17 together, after final make up of the connector, with the pin body, as previously described, compressed axially into the box and with the energized interference fit between the conical surfaces 15 and 18 of the pin and box.

In this form, a plurality of suitable discs 250 are inserted through the tangential opening 55 into the opposing grooves 53 and 54 of the pin and box, so as to be engaged between the upwardly facing circumferential shoulder 51 on the pin and the downwardly facing circumferential shoulder 52 on the box. The discs, as in the case of the balls 150, are inserted while the pin and box shoulders 20 and 21 are engaged by the loading tool T and the energizing pressure is between the tapered surfaces of the pin and the box, so that upon relief of the fluid pressure and the preload force the pressure energized interference fit is effected between the pin and the box, and the locking discs 250 engage the shoulders 51 and 52 at 256 and 257 to prevent separation of the connection. In the event that disconnection is ultimately contemplated, it will be understood that the discs may be suitably removed from the connection following the reapplication of the preloading forces, whereby to reduce frictional resistance to removal of the discs. For purpose of disc removal, it will be understood that the discs may be replaced from the opposing grooves by suitable means (not shown) insertible into the locking groove.

Referring to FIGS. 9 and 10, the connector locking means L comprises a split locking ring 350 adapted to be installed between the upwardly facing shoulder 351 on the pin body 14 and the downwardly facing shoulder 352 on the box body 17. Here again, the pin shoulder 351 defines the lower wall of a circumferentially extended groove 353 in the pin body, and the downwardly facing box shoulder 352 defines the upper wall of a circumferentially continuous groove 354 in the box body 17. In this form the pin body 14 has an upward extension 314 radially spaced inwardly from the upper end of the box body 17 to provide substantial annular clearance 355 therebetween. The thrust shoulder 20 is formed on the pin extension 314 at the upper end of the pin extension so that the split lock ring 350 can be inserted between the pin and the box into the groove 353 through the clearance 355.

The lock ring 350 has an upper flat face 356 engageable beneath the box shoulder 352 and the lower flat face 357 engageable with the pin shoulder 351 when the lock ring is moved into the groove 353 and allowed to expand normally outwardly into the box groove 354. As seen in FIG. 10, the lock ring 350 is radially split, at 358 so as to be resiliently contractible for passage downwardly between the pin and box in a contracted condition. At its opposing ends, the lock ring 350 is provided with suitable holes or recesses 359 engageable by the usual pulling tool to cause the ring to be contracted, and in addition, the outwardly flared inner upper end 360 of the box body 17 can be used to assist in compressing the ring circumferentially as it is moved into the groove 353 into engagement with the pin shoulder 351. Thereafter, the lock ring 350 can be released for inherent expansion outwardly into the box groove 354 to lock the connector parts together prior to release of the preload force applied by the tool T to the loading shoulders 20 and 21 on the pin and box.

From the foregoing, it will now be apparent that the present invention provides a lockable pin and box connector for pipe, such as pipeline and piles, wherein the pin and box are preloaded together at the opposing transversely extended shoulders during the final make up of the connection and prior to the release of energizing pressure fluid from between the pin and box and that the resultant pressure energized interference fit, as well as the compressive preloading, is maintained by the locking means L inserted while the connector parts are held in their preloaded and pressure energized condition.

I claim:

1. A lockable rigid pipe connector comprising: a pin and a box; said pin having an externally tapered section and a transverse make up shoulder; said box having an internally tapered body section to receive the tapered section of said pin and having an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression and said box section in tension by a pressure energized shrink fit between said pin section and said box section upon relief of said pressure fluid; said pin and box having opposed axially spaced locking shoulders for receiving locking means insertable between said locking shoulders while said make up shoulders are under compression and said box is in tension and one of said pin and box having access means enabling insertion of said locking means between said locking shoulders.

2. A lockable rigid pipe connector as defined in claim 1; said locking shoulders being on said pin and box axially remote from said make up shoulders and including locking means inserted between said locking shoulders.

3. A lockable rigid pipe connector as defined in claim 2; said locking shoulders extending circumferentially of said pin and box, and said means enabling insertion of said locking means comprising an opening in said box leading to the space between said locking shoulders.

4. A lockable rigid pipe connector as defined in claim 2; said locking shoulders extending circumferentially of said pin and box, and said means enabling insertion of said locking means comprising a portion of said pin spaced radially inwardly from said box to form an annular space therebetween adjacent the locking shoulder on said pin and opening outwardly between said pin and box.

5. A lockable rigid pipe connector as defined in claim 1; said locking shoulders being on said pin and box axially remote from said make up shoulders, and including locking means inserted between said locking shoulders, said locking shoulders extending circumferentially of said pin and box, and said means enabling insertion of said locking means comprising an opening in said box leading to the space between said locking shoulders, and said locking means comprising a rod having opposed surfaces inserted through said opening and engaged between said locking shoulders.

6. A lockable rigid pipe connector as defined in claim 1; said shoulders being on said pin and box axially remote from said make up shoulders, and including locking means inserted between said locking shoulders, said locking shoulders extending circumferentially of said pin and box, and said means enabling insertion of said locking means comprising an opening in said box leading to the space between said locking shoulders, and said locking means comprising a rod having opposed surfaces inserted through said opening and engaged between said locking shoulders, said opending extending tangentially of said box between said locking shoulders.

7. A lockable rigid pipe connector as defined in claim 1; said locking shoulders being on said pin and box axially remote from said make up shoulders, and including locking means inserted between said locking shoulders, said locking shoulders extending circumferentially of said pin and box, and said means enabling insertion of said locking means comprising an opening in said box leading to the space between said locking shoulders, said pin and said box having opposed circumferentially extended grooves confronting one another with one of said grooves formed by one of said locking shoulders, and said locking means comprising a square rod confined in said grooves and engaging said locking shoulders.

8. A lockable rigid pipe connector as defined in claim 1; said locking shoulders being on said pin and box axially remote from said make up shoulders, and including locking means inserted between said locking shoulders, said locking shoulders extending circumferentially of said pin and box, and said means enabling insertion of said locking means comprising an opening in said box leading to the space between said locking shoulders, said pin and said box having opposed circumferentially extended grooves confronting one another with one of said grooves formed by one of said locking shoulders, and said locking means comprising a series of balls confined in said grooves and engaging said locking shoulders.

9. A lockable rigid pipe connector as defined in claim 8, said grooves being arched races substantially conforming with said balls.

10. A lockable rigid pipe connector as defined in claim 1; said locking shoulders being on said pin and box axially remote from said make up shoulders, and including locking means inserted between said locking shoulders, said locking shoulders extending circumferentially of said pin and box, and said means enabling insertion of said locking means comprising an opening in said box leading to the space between said locking shoulders, said pin and said box having opposed circumferentially extended grooves confronting one another with one of said grooves formed by one of said locking shoulders, and said locking means comprising a series of discs confined in said grooves and engaging said locking shoulders.

11. A lockable rigid pipe connector as defined in claim 2; said locking shoulders extending circumferentially of said pin and box, and said means enabling insertion of said locking means comprising a portion of said pin spaced radially inwardly from said box to form an annular space therebetween adjacent the locking shoulder on said pin and opening outwardly between said pin and box, and said locking means comprising a resilient locking ring movable through said annular space into engagement with the locking shoulder on said pin and expansible into engagement between said locking shoulders.

12. A lockable rigid pipe connector as defined in claim 2; said locking shoulders extending circumferentially of said pin and box, and said means enabling insertion of said locking means comprising a portion of said pin spaced radially inwardly from said box to form an annular space therebetween adjacent the locking shoulder on said pin and opening outwardly between said pin and box, said locking means comprising a resilient locking ring movable through said annular space into engagement with the locking shoulder on said pin and expansible into engagement between said locking shoulders, and said box having an inwardly tapered surface bordering said opening for resiliently contracting said ring upon movement of said ring into said opening.

13. The method of making rigid pipe connections comprising: axially coengaging tapered pin and tapered box connector parts and disposing axially spaced sealed portions thereof in sealing relation and transversely disposed make up shoulders thereof in opposing initial confronting relation, compressively loading said make up shoulders together by applying opposite axial forces to said pin and box placing said pin in compression and said box in tension while circumferentially expanding said box and compressing said pin by the application of pressure fluid therebetween between said sealing portions thereof, inserting locking means between opposed locking shoulders on said connector parts, and then relieving said pressure fluid to allow shrinking of said box and expansion of said pin into interlocking relation with said pin and box respectively held in axial compression and tension.

14. The method of claim 13; said locking shoulders extending circumferentially of said connector parts and forming opposing circumferential grooves, said locking means being inserted through an opening extending tangentially into said grooves.

15. The method of claim 13; said locking shoulders extending circumferentially of said connector parts and forming opposing circumferential grooves, said locking means being a rod inserted through an opening extending tangentially into said grooves.

16. The method of claim 13; said locking shoulders extending circumferentially of said connector parts and forming opposing circumferential grooves, said locking means being balls inserted through an opening extending tangentially into said grooves.

17. The method of claim 13; said locking shoulders extending circumferentially of said connector parts and forming opposing circumferential grooves, said locking means being discs inserted through an opening extending tangentially into said grooves.

18. The method of claim 13; said locking shoulders extending circumferentially of said connector parts and defining with said connector parts an annular space opening externally of said connector parts, said locking means being inserted through the opening of said annular space.

19. The method of claim 13; said locking shoulders extending circumferentially of said connector parts and defining with said connector parts an annular space opening externally of said connector parts, said locking means being a resiliently expansible split ring contracted during movement through said space and expansible between said shoulders, inserted through the opening of said annular space.

* * * * *